(12) United States Patent
Srivastava et al.

(10) Patent No.: US 11,055,646 B2
(45) Date of Patent: *Jul. 6, 2021

(54) AUTOMATED TICKET RESOLUTION

(71) Applicant: Accenture Global Solutions Limited, Dublin (IE)

(72) Inventors: Krupa Srivastava, Tamil Nadu (IN); Vijayaraghavan Koushik, Chennai (IN); Rajendra T. Prasad, Bangalore (IN); VijayChandar Natesan, Bangalore (IN); Rajesh Pappu, Andhra Pradesh (IN); Chetan Kumar Baikady, Karnataka (IN); David Golding, Fulham (GB); Luke Higgins, Pymble (AU); Leon Whine, Mentone (AU); Raanan Zion, Caulfield (AU); Sunder Sankararaman, Bangalore (IN); KrishnaKumar Dorai Rangarajan, Chennai (IN); Radhu Selvaraj, Chennai (IN); Lakshmi Paramasivam, Chennai (IN); Udayakumar Nagarajan, Chennai (IN); Parvatha Narayanan, Chennai (IN); Chandrasekhar Athinarayanan, Chennai (IN); Senthil Kumar Venugopal, Chennai (IN); Srinivasan Rangaswamy, Coimbatore (IN)

(73) Assignee: Accenture Global Solutions Limited, Dublin (IE)

( * ) Notice: Subject to any disclaimer, the term of this patent is extended or adjusted under 35 U.S.C. 154(b) by 50 days.

This patent is subject to a terminal disclaimer.

(21) Appl. No.: 16/456,479

(22) Filed: Jun. 28, 2019

(65) Prior Publication Data

US 2019/0318295 A1 Oct. 17, 2019

Related U.S. Application Data

(63) Continuation of application No. 15/645,440, filed on Jul. 10, 2017, now Pat. No. 10,380,520.

(30) Foreign Application Priority Data

Mar. 13, 2017 (IN) .............................. 201741008620

(51) Int. Cl.
*G06Q 10/06* (2012.01)
*G06Q 10/10* (2012.01)
(Continued)

(52) U.S. Cl.
CPC ..... *G06Q 10/063118* (2013.01); *G06N 20/00* (2019.01); *G06Q 10/06313* (2013.01);
(Continued)

(58) Field of Classification Search
None
See application file for complete search history.

(56) References Cited

U.S. PATENT DOCUMENTS 8,935,153 B2   1/2015  McKeeman et al.
2005/0081118 A1*  4/2005  Cheston .............. G06F 11/0784
                                                  714/47.1
(Continued)

OTHER PUBLICATIONS

Web Crawler (Web Crawler, Wikipediea, cited from wayback machine dated Feb. 26, 2006—https://web.archive.org/web/20060226050906/http://en.wikipedia.org/wiki/Web_crawler).*
(Continued)

*Primary Examiner* — Matthew D Henry
(74) *Attorney, Agent, or Firm* — Harrity & Harrity, LLP

(57) ABSTRACT

A device may communicate with a server to obtain historical ticket data. The device may generate a data model, based on the historical ticket data. The device may communicate with a client device to obtain ticket data relating to an issue associated with a project. The device may classify, using the data model, the ticket data into a ticket type. The device may generate, using the data model and based on the ticket type, a set of recommended resolutions for resolving the issue
(Continued)

associated with the project. The device may select, from the set of recommended resolutions, a particular resolution based on a set of selection criteria. The device may automatically perform one or more actions to implement the particular resolution to resolve the issue associated with the project.

20 Claims, 6 Drawing Sheets

(51) Int. Cl.
  *G06N 20/00* (2019.01)
  *H04L 12/24* (2006.01)
(52) U.S. Cl.
  CPC .......... *G06Q 10/103* (2013.01); *H04L 41/16* (2013.01); *H04L 41/5074* (2013.01)

(56) References Cited

U.S. PATENT DOCUMENTS

| | | | |
|---|---|---|---|
| 2010/0180280 A1* | 7/2010 | Chang | G06F 9/5066 718/104 |
| 2010/0318846 A1 | 12/2010 | Sailer et al. | |
| 2013/0262082 A1 | 10/2013 | McKeeman et al. | |
| 2014/0129536 A1 | 5/2014 | Anand et al. | |
| 2014/0351176 A1* | 11/2014 | Jan | G06N 7/005 706/12 |
| 2015/0348051 A1* | 12/2015 | Bodda | G06Q 30/016 705/304 |
| 2016/0188440 A1* | 6/2016 | Bates | G06F 11/3624 717/129 |
| 2017/0019291 A1* | 1/2017 | Tapia | H04L 41/0631 |
| 2017/0048109 A1 | 2/2017 | Kant et al. | |
| 2018/0005286 A1* | 1/2018 | Grabarnik | G06F 16/2477 |
| 2018/0150555 A1* | 5/2018 | Karuppasamy | G06F 16/367 |
| 2018/0260760 A1 | 9/2018 | Srivastava et al. | |

OTHER PUBLICATIONS

Agarwal et al. (Smart Dispatch: Enabling Efficient Ticket Dispatch in an IT Service Environment, KDD '12: Proceedings of the 18th ACM SIGKDD international conference on Knowledge discovery and data mining, Beijing China, Aug. 2012, pp. 1393-1401).*

Gilenson S., "Managing IT Through a Prism of Change With IT Operations Analytics," http://insights.wired.com/profiles/blogs/managing-it-through-a-prism-of-change-with-it-operations, Jul. 30, 2014, 5 pages.

Jin Y., et al., "Nevermind, the Problem Is Already Fixed: Proactively Detecting and Troubleshooting Customer DSL Problems," Co-NEXT' 10 Proceedings of the 6th International Conference, Article No. 7, Dec. 2010, 12 pages.

Manning C.D., et al., "The Stanford CoreNLP Natural Language Processing Toolkit," https://nlp.stanford.edui/pubs/StanfordCoreNlp2014.pdf, Apr. 27, 2014, 6 pages.

NLTK 3.2.4 Documentation, "Natural Language Toolkit," http://www.nltk.org/, May 21, 2017, 2.

Scikit Learn, "Scikit-Learn Machine Learning in Python," http://www.scikit-learn.org/stable/, Sep. 2016, 3 pages.

Shukla, "Why IBM Smarter Commerce is More End User Centric," https://www.linkedin.com/pulse/why-ibm-smarter-commerce-more-end-user-centric-sudhanshushukla, May 5, 2015, 7 pages.

Splunk, "The Platform for Digital Transformation," https://www.splunk.com/, 2017, 8 pages.

Stanford, "Deep Learning in Natural Language Processing," https://nlp.stanford.edu/projects/DeepLearingInNaturalLanguageProcessing.shtml, Mar. 16, 2017, 2 pages.

Wikipedia, "Additive Smoothing," https://en.wikipedia.org/wiki/Additive_smoothing, May 9, 2017, 4 pages.

Wkipedia, "Apache Lucene," https://en.wikipedia.org/wiki/Apache_Lucene, Jul. 7, 2017, 4 pages.

Wkipedia, "Deep Learning," https://en.wikipedia.org/wiki/Deep_learning, Jul. 7, 2017, 20 pages.

Wikipedia, "Lemmatisation," https://en.wikipedia.org/wiki/Lemmatisation, Nov. 6, 2017, 3 pages.

Wkipedia, "Lexical Analysis," https://en.wikipedia.org/wiki/Lexical_analysis, Jun. 22, 2017, 10 pages.

Wikipedia, "Pierre-Simon Laplace," https://en.wikipedia.org/wiki/Pierre-Simon_Laplace, Jul. 6, 2017, 17 pages.

Wikipedia, "Stemming," https://en.wikipedia.org/wiki/Stemming, Jul. 1, 2017, 7 pages.

Wikipedia, "Tokenization," https://en.wikipedia.org/wik/Tokenization, Mar. 15, 2015, 1 page.

Wkipedia, "Stop Words," https://en.wikipedia.org/wiki/Stop_Words, Apr. 5, 2017, 2 pages.

* cited by examiner

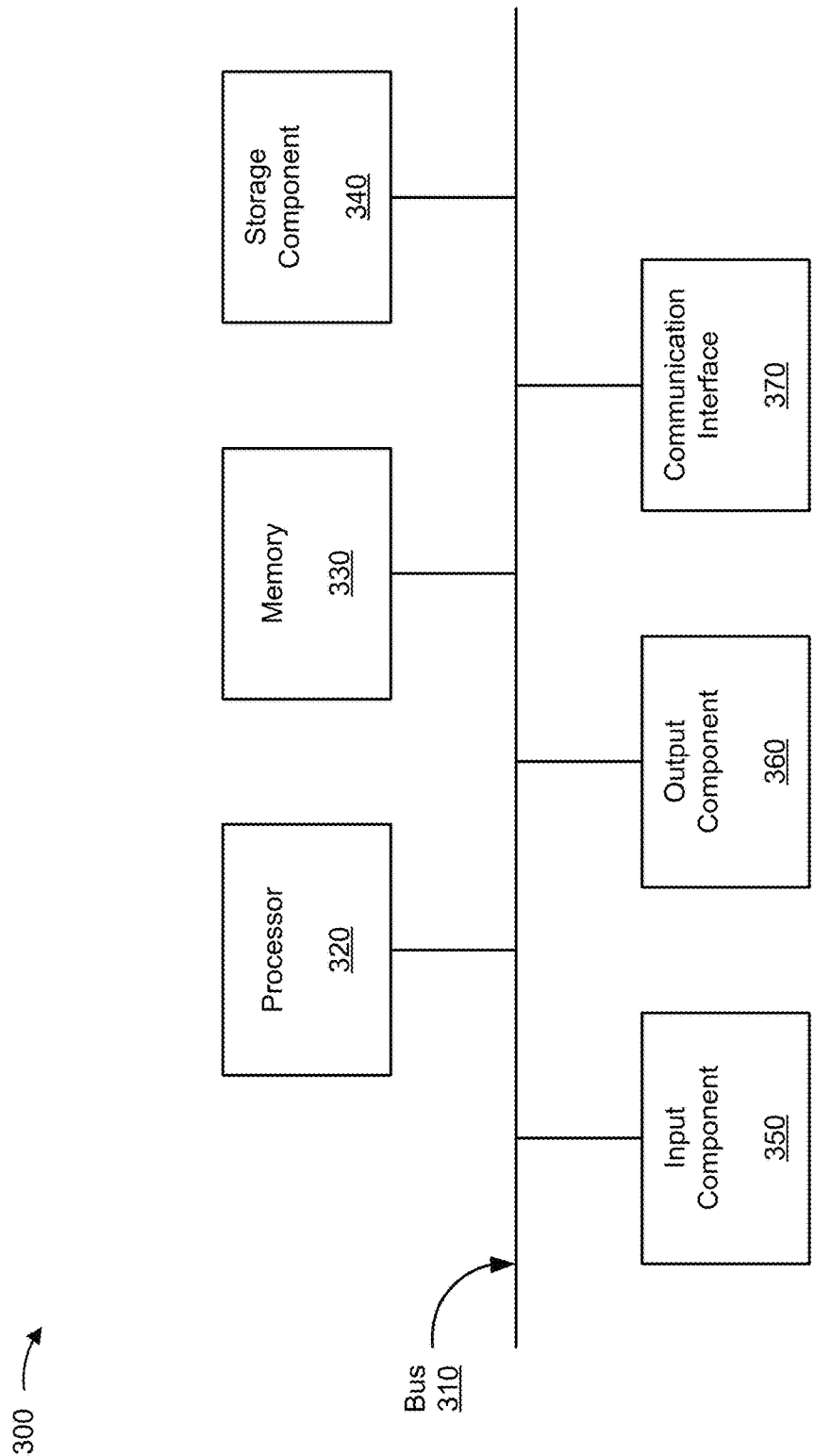

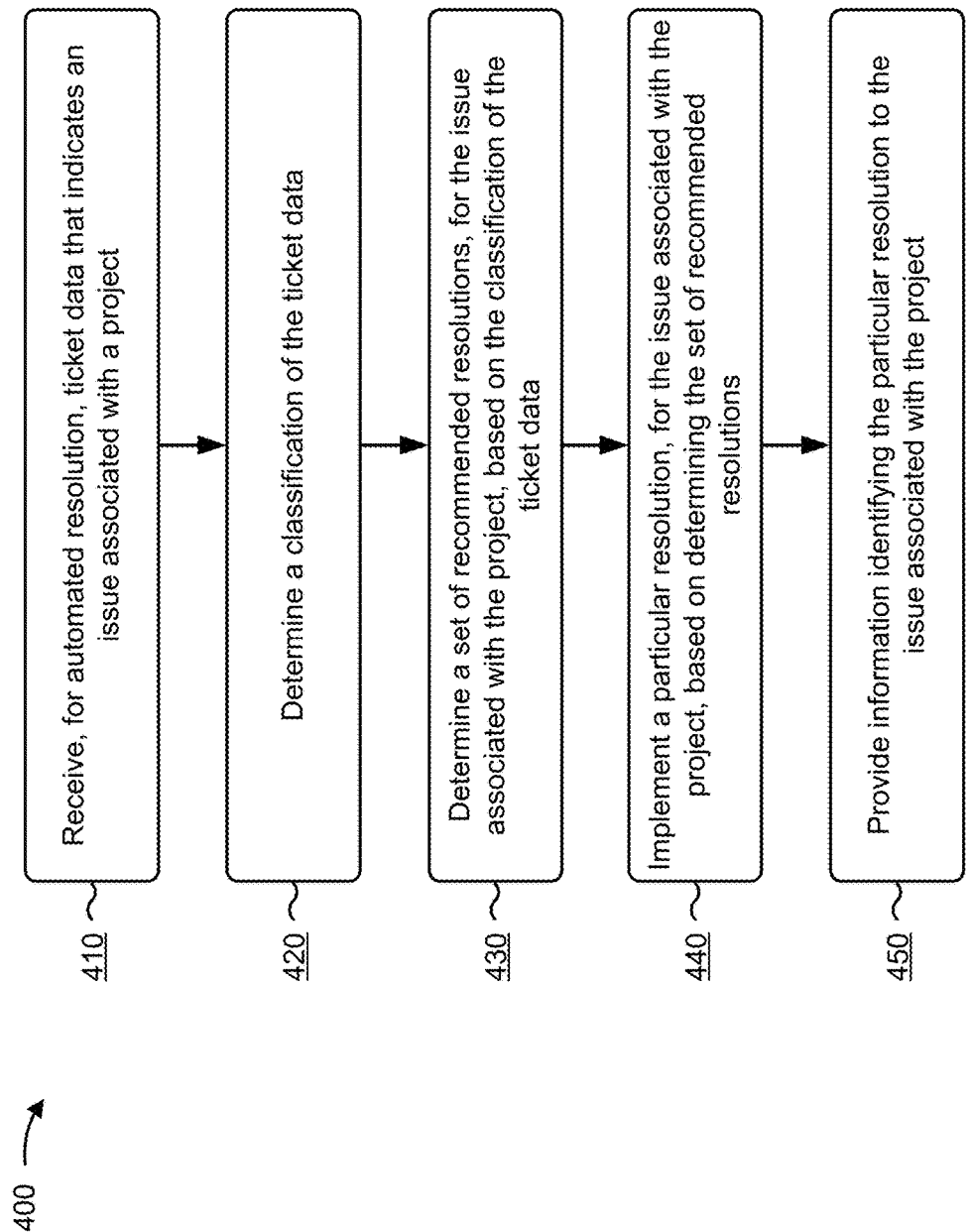

_US 11,055,646 B2_

AUTOMATED TICKET RESOLUTION

RELATED APPLICATION

This application is a continuation of U.S. patent application Ser. No. 15/645,440, filed on Jul. 10, 2017, which claims priority under 35 U.S.C. § 119 to Indian Patent Application No. 201741008620, filed on Mar. 13, 2017, the contents of which are incorporated by reference herein in its their entirety.

BACKGROUND

Using a ticket management system to classify and resolve issues may be difficult in situations where different parties interact in a multitude of different situations, creating a massive number of issues to resolve. Manual classification and/or resolution of issues may be impossible when tens of thousands, hundreds of thousands, or even millions of issues need to be resolved.

SUMMARY

According to some possible implementations, a device may include one or more processors. The one or more processors may communicate with a server to obtain historical ticket data. The one or more processors may generate a data model, based on the historical ticket data. The one or more processors may communicate with a client device to obtain ticket data relating to an issue associated with a project. The one or more processors may classify, using the data model, the ticket data into a ticket type. The one or more processors may generate, using the data model and based on the ticket type, a set of recommended resolutions for resolving the issue associated with the project. The one or more processors may select, from the set of recommended resolutions, a particular resolution based on a set of selection criteria. The one or more processors may automatically perform one or more actions to implement the particular resolution to resolve the issue associated with the project.

According to some implementations, a non-transitory computer-readable medium may store instructions. The one or more instructions, when executed by one or more processors, may cause the one or more processors to receive, from a client device, ticket data for automated resolution. The ticket data may relate to an issue associated with a project. The one or more instructions, when executed by the one or more processors, may cause the one or more processors to determine a classification of the ticket data based on the ticket data and historical ticket data. The one or more instructions, when executed by the one or more processors, may cause the one or more processors to determine, by applying a machine learning technique, a particular resolution for the issue associated with the project, based on the classification of the ticket data. The one or more instructions, when executed by the one or more processors, may cause the one or more processors to generate a user interface associated with identifying the particular resolution for the issue associated with the project. The one or more instructions, when executed by the one or more processors, may cause the one or more processors to provide, for display via the client device, the user interface to identify the particular resolution for the issue associated with the project.

According to some possible implementations, a cloud platform may include one or more computing resources. The one or more computing resources may implement an automatic ticket classification module to classify ticket data into a ticket type. The ticket data may indicate an issue associated with a project. The automatic ticket classification module may be to classify the ticket data into the ticket type by comparing the ticket data and historical ticket data. The one or more computing resources may implement a machine learning module to analyze the ticket data and the historical ticket data associated with the ticket type. The one or more computing resources may implement a resolution identification module to identify a set of recommended resolutions based on analyzing the ticket data and the historical ticket data associated with the ticket type. The one or more computing resources may implement a resolution selection module to select a particular resolution, based on a set of selection criteria. The resolution selection module may include a resolution scoring submodule to rank the set of recommended resolutions or a resolution analysis submodule to determine whether one or more resolutions, associated with the set of recommended resolutions, satisfy a threshold, based on the resolution scoring submodule ranking the set of recommended resolutions. The one or more computing resources may implement a ticket resolution module to automatically implement the particular resolution to resolve the issue associated with the project.

BRIEF DESCRIPTION OF THE DRAWINGS

FIG. 3 is a diagram of example components of one or more devices of FIG. 2; and FIG. 4 is a flow chart of an example process for applying machine learning and/or natural language processing techniques to automatically resolve ticket issues.

DETAILED DESCRIPTION

The following detailed description of example implementations refers to the accompanying drawings. The same reference numbers in different drawings may identify the same or similar elements.

A ticket management system may resolve issues indicated by ticket data. In some cases, resolving the issue with human intervention may be time and resource intensive, while also being prone to human error. This may result in a poor user experience, and may lead to excessive use of computing resources (e.g., from a person researching a ticket, providing a failed resolution, re-researching the ticket, providing another resolution, etc.). In other cases, resolving a ticket issue (with or without human intervention) may be difficult due to the ticket management system receiving a large volume of ticket data relating to a multitude of different issues. This may result in high computer processing and/or storage costs. For example, applying a ticket management system in a field that uses big data may require classifying and/or resolving issues for tens of thousands, hundreds of thousands, or even millions of tickets.

Implementations described herein may provide for a cloud platform to automatically classify ticket data, and to automatically identify and implement a resolution based on the classification. In this way, the cloud platform reduces utilization of computing resources based on automatically classifying the ticket data to reduce processing (e.g., classification of ticket data allows the cloud platform to process a subset of all ticket data, rather than processing all ticket data), reduces utilization of computing resources based on faster resolution of a ticket issue (e.g., less resources may be needed to resolve the ticket issue), reduces utilization of computing resources and/or network resources based on decreasing a period of time where a network device is using additional resources to complete a task (e.g. a network device may use less resources to complete a task when operating properly), or the like. By reducing the utilization of computing resources, the cloud platform improves overall system performance due to efficient and effective allocation of resources. Furthermore, faster resolution of a ticket issue improves user experience and minimizes time that a user may lose due to the ticket issue (e.g., a user may be unable to work if experiencing a technical error).

Figure 1A:
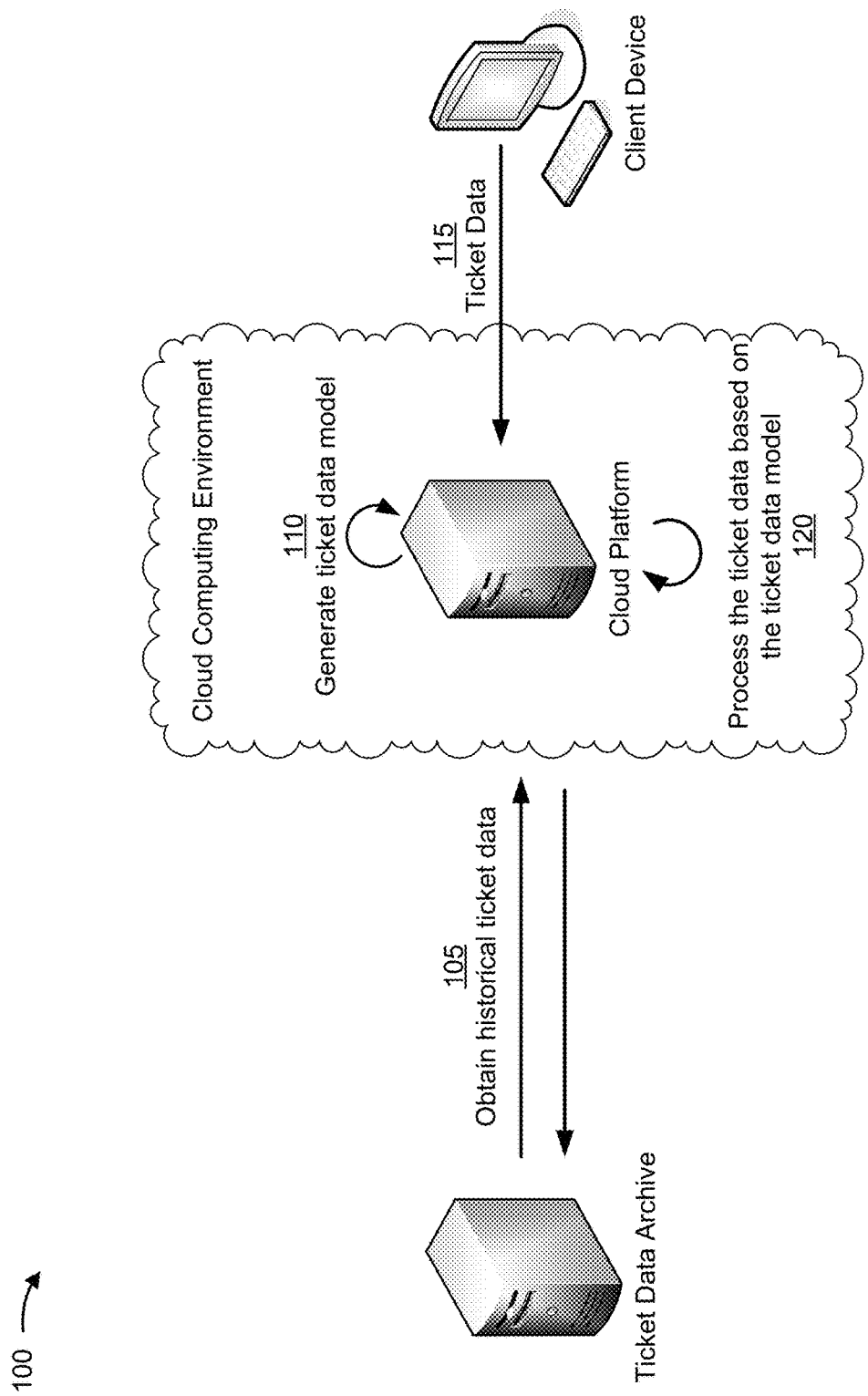
FIGS. 1A and 1B are diagrams of an overview of an example implementation described herein.
Figure 1B:
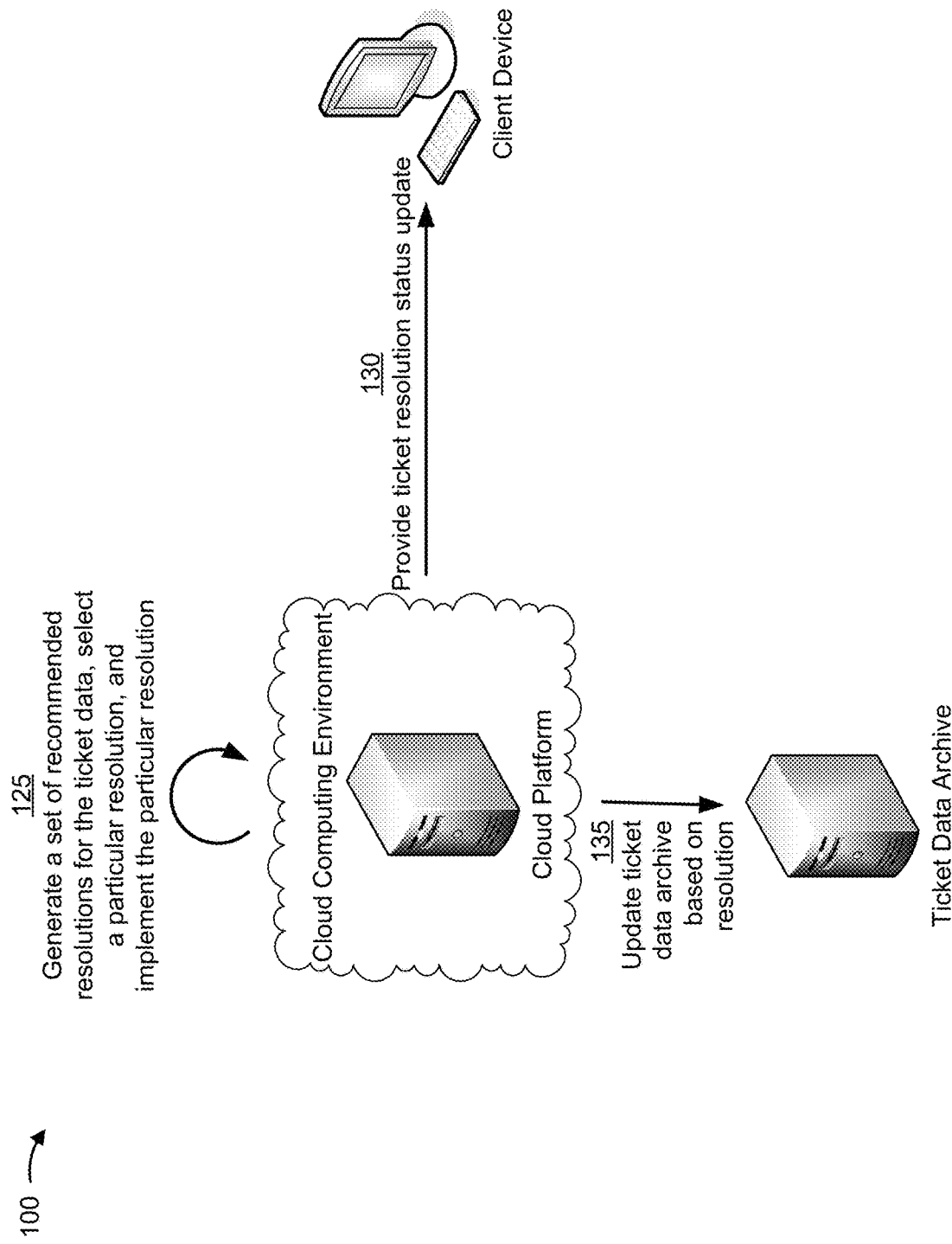

FIGS. 1A and 1B are diagrams of an overview of an example implementation 100 described herein. As shown in FIG. 1A, example implementation 100 may include a cloud platform, a client device, and a ticket data archive. As shown by reference number 105, the cloud platform may obtain, from the ticket data archive, historical ticket data. The ticket data archive may store historical ticket data for millions, tens of millions, hundreds of millions, or even billions of tickets. The information included in the historical ticket data may include information indicating an entity (e.g., a user or a business), information indicating an issue associated with a project, ticket resolution information (e.g., one or more ways in which the issue was resolved or attempted to be resolved, whether the issue was resolved manually or automatically, etc.), or the like. Additionally, or alternatively, the cloud platform may obtain historical ticket data by crawling the web. By obtaining a large volume of historical ticket data (e.g., big data), the cloud platform is able to generate a ticket data model that accurately and intelligently provides recommended resolutions to ticket issues, as described further herein.

As shown by reference number 110, the cloud platform may generate a ticket data model based on obtaining the historical ticket data. For example, the cloud platform may process the historical ticket data to generate the ticket data model. In some cases, the ticket data model may analyze the historical ticket data to classify the historical ticket data into a ticket type. For example, if an issue associated with the historical ticket data relates to a user login issue, the ticket data model may classify the historical ticket data into a ticket type relating to user authentication issues. In this way, the historical ticket data may be separated into groups based on ticket types (e.g., based on similarities).

As shown by reference number 115, the cloud platform may receive, from the client device, ticket data. For example, the cloud platform may cause a user interface associated with the client device to display information indicating ticket data. The ticket data may include one or more fields for describing an issue associated with a project. In this case, a user may interact with the user interface (e.g., to input information into the one or more fields), which may cause the client device to transmit the ticket data to the cloud platform. In some implementations, the cloud platform may automatically populate a portion of the one or more fields using predictive analytics.

As shown by reference number 120, the cloud platform may process the ticket data based on the ticket data model. For example, the cloud platform may use the ticket data as input for the ticket data model, and the ticket data model may classify the ticket data by analyzing information associated with the ticket data (e.g., information in the one or more fields of the ticket data). The information included in the ticket data may include information indicating an entity (e.g., a user, a group of users, a business, etc.), information indicating an issue associated with the entity (e.g., an issue that a company or a user seeks to resolve, such as an issue relating to a project or an application, etc.), or the like. In some implementations, the cloud platform may use the ticket data model to analyze the information included in the ticket data by applying a natural language processing technique and/or a machine learning technique. For example, the cloud platform may parse text associated with the ticket data, and may analyze the parsed text to determine the ticket type of the ticket data. The cloud platform may use the data model to further analyze historical ticket data with the same or similar ticket type. In this way, the cloud platform identifies a subset of the historical ticket data that may be used to determine a particular resolution to the issue associated with the ticket data, thereby conserving processing resources relative to using all the historical ticket data to determine a particular resolution.

As shown in FIG. 1B, and by reference number 125, the cloud platform may use the data model to generate a set of recommended resolutions for the ticket data, may use the data model to select a particular resolution, and may implement the particular resolution. The set of recommended resolutions may include automatically generating code, altering code, removing code, allocating computing resources, reallocating computing resources, assigning a developer to resolve an issue associated with a project, and/or the like, and may further include an estimated amount of time to resolve the issue. In some implementations, the cloud platform may use the ticket data model to process a subset of the historical ticket data (e.g., historical ticket data with the same or similar ticket type) and may generate a set of recommended resolutions based on processing the subset of the historical ticket data. For example, the cloud platform may apply a machine learning technique or a natural language processing technique to determine how issues associated with the subset of the historical ticket data were resolved. In some implementations, the cloud platform may automatically generate at least a portion of the set of recommended resolutions.

Additionally, the cloud platform may use the ticket data model to select a particular resolution, from the set of recommended resolutions. For example, the cloud platform may apply a machine learning or a natural language processing technique to determine the particular resolution to select. As an example, the cloud platform may apply a machine learning technique or a natural language processing technique to analyze the set of recommended resolutions, which may include one or more particular resolutions that involve assigning a developer to resolve the issue. In this case, the cloud platform may parse one or more developer schedules, one or more lists of developer skillsets, or the like, to determine a developer most able to resolve the issue. Additionally, or alternatively, the cloud platform may perform one or more actions to automatically implement the particular resolution. For example, the cloud platform may generate code, alter code, and/or remove code as part of a particular resolution, may allocate and/or reallocate computing resources as part of a particular resolution, may assign the ticket data to a developer as part of a particular resolution, and/or the like. Additionally, the cloud platform may provide, to the client device, information indicating an estimated amount of time to resolve the issue.

As shown by reference number 130, the cloud platform may provide a ticket resolution status update to the client device. For example, the cloud platform may provide the ticket resolution status update after a threshold period of time is satisfied, after a threshold amount of the particular resolution is completed, or the like. Additionally, or alternatively, the cloud platform may monitor the project and/or receive feedback about the particular resolution to determine an effectiveness level of the resolution. As shown by reference number 135, the cloud platform may update the ticket data archive based on the particular resolution. For example, the cloud platform may transmit information indicating the particular resolution, and the ticket data, for storage by the ticket data archive. This may allow subsequent requests for historical ticket data (e.g., to update the ticket data model) to access the ticket and the particular resolution associated with the ticket. Additionally, or alternatively, the cloud platform may update the ticket data archive based on monitoring the project and/or receiving feedback about the effectiveness of the resolution.

By using machine learning and natural language processing to classify ticket data and implement a resolution to an issue associated with a project, the cloud platform reduces utilization of computing resources (e.g., relative to using human intervention to resolve the ticket issue, relative to using conventional processing methods to resolve the ticket issue, etc.). Furthermore, by reducing the utilization of computing resources, and by reducing a time in which the cloud platform resolves an issue, the cloud platform is able to efficiently and effectively allocate resources in a manner that allows the cloud platform to process large amounts of ticket data (e.g., big data).

As indicated above, FIGS. 1A and 1B are provided merely as an example. Other examples are possible and may differ from what was described with regard to FIGS. 1A and 1B. For example, while FIGS. 1A and 1B describe a data flow that processes ticket data associated with one ticket, implementations may exist that automatically classify and automatically resolve issues relating to tens of thousands, hundreds of thousands, or even millions of tickets.

Figure 2A:
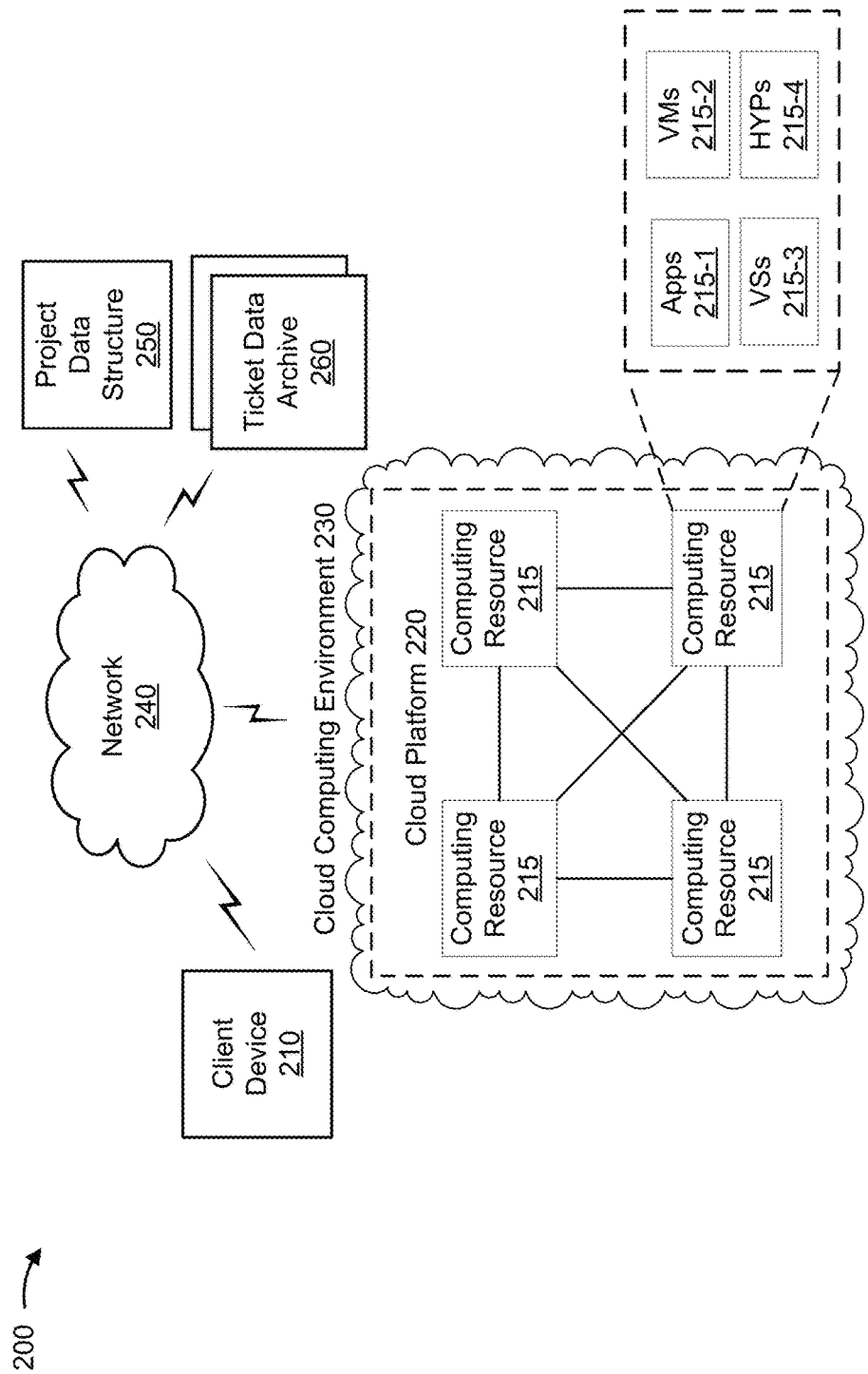
FIGS. 2A and 2B are diagrams of an example environment in which systems and/or methods, described herein, may be implemented.
Figure 2B:
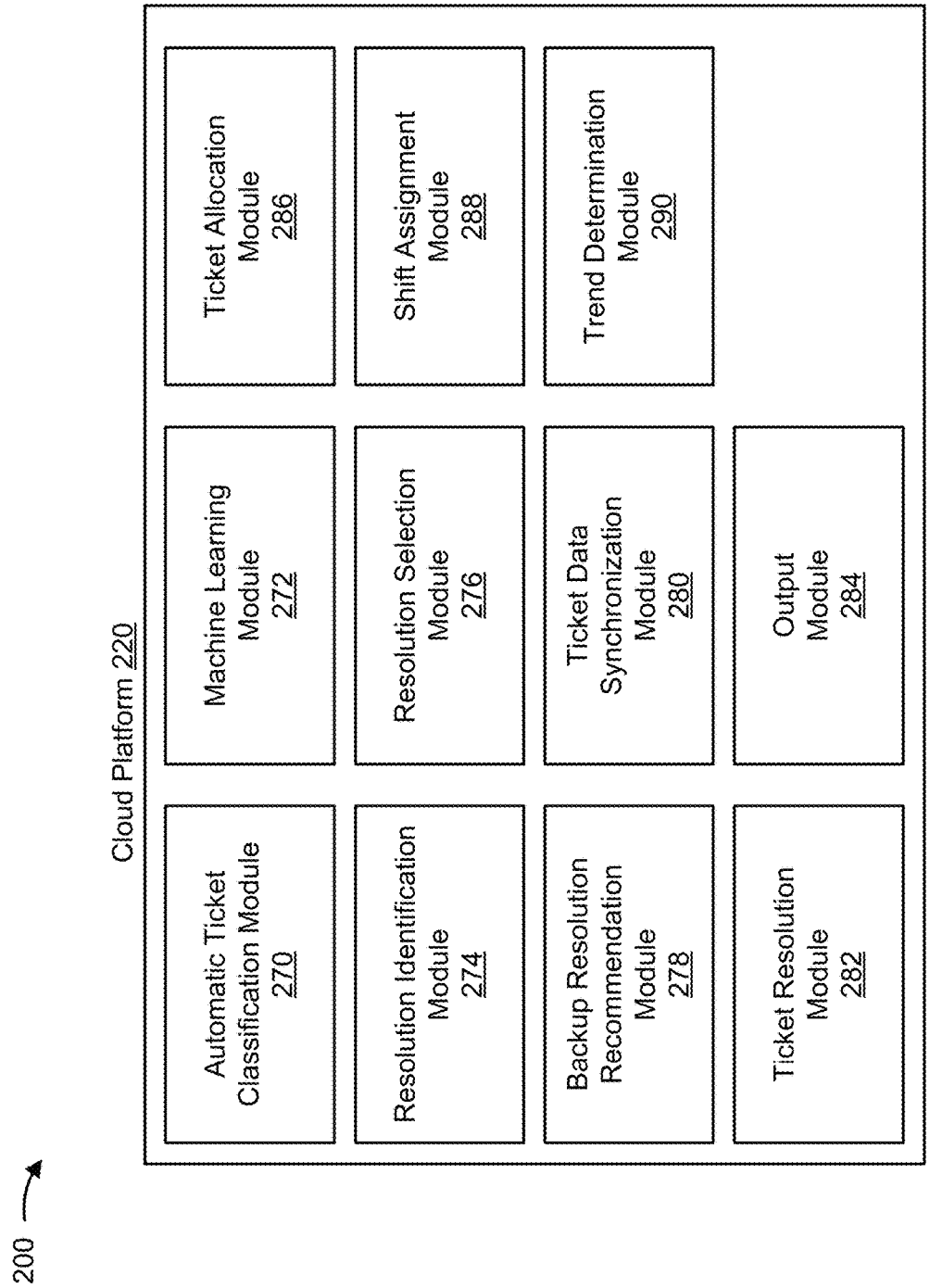

FIGS. 2A and 2B are diagrams of an example environment 200 in which systems and/or methods, described herein, may be implemented. As shown in FIG. 2A, environment 200 may include client device 210, cloud platform 220 hosted within cloud computing environment 230, network 240, project data structure 250, and/or ticket data archive 260. Devices of environment 200 may interconnect via wired connections, wireless connections, and/or a combination of wired and wireless connections.

Client device 210 includes one or more devices capable of receiving, storing, processing, and/or providing information associated with ticket data. For example, client device 210 may include a communication and/or computing device, such as a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), or a similar type of device. In some implementations, client device 210 may provide ticket data to cloud platform 220. Additionally, or alternatively, client device 210 may receive ticket resolution status updates from cloud platform 220.

Cloud platform 220 includes one or more devices capable of receiving, generating, storing, classifying, processing, and/or providing information associated with ticket data, as described elsewhere herein. For example, cloud platform 220 may include a cloud server or a group of cloud servers. In some implementations, cloud platform 220 may communicate with project data structure 250 to obtain project information (e.g., source code relating to a project). Additionally, or alternatively, cloud platform 220 may communicate with ticket data archive 260 to obtain historical ticket data, to update ticket data archive 260 with additional historical ticket data, to provide information indicating an effectiveness of a resolution associated with ticket data, and/or the like.

In some implementations, as shown, cloud platform 220 may be hosted in cloud computing environment 230. Notably, while implementations described herein describe cloud platform 220 as being hosted in cloud computing environment 230, in some implementations, cloud platform 220 may not be cloud-based (i.e., may be implemented outside of a cloud computing environment) or may be partially cloud-based. Although implementations are described herein as classifying and resolving issues relating to a project development environment, cloud platform 220 may be utilized to classify and resolve issues relating to other environments, such as a corporate environment, a governmental environment, an educational environment, or the like.

Cloud computing environment 230 includes an environment that hosts cloud platform 220. Cloud computing environment 230 may provide computation, software, data access, storage, and/or other services that do not require end-user knowledge of a physical location and configuration of system(s) and/or device(s) that host cloud platform 220. As shown, cloud computing environment 230 may include a group of computing resources 215 (referred to collectively as "computing resources 215" and individually as "computing resource 215").

In some implementations, cloud computing environment 230 may include other cloud computing resources, such as R based statistical computing resources (e.g., an R based algorithm to compute a ticket inflow rate of tickets relating to project issues, and perform allocation of computing resources based on ticket inflow rate), Microsoft Azure based computing resources (e.g., an Azure based algorithm to determine service level agreement compliance rates—failing to satisfy a threshold may indicate that a project has an issue, and may cause a ticket to be automatically generated), International Business Machines (IBM) Watson based computing resources (e.g., to provide user interface functionalities), or the like. In some implementations, one or more cloud computing resources may be collocated in cloud computing environment 230. Additionally, or alternatively, one or more cloud computing resources may be hosted in another cloud computing environment that may communicate with cloud computing environment 230. Integrating multiple tools designed for different project aspects (e.g., R for statistical analysis, Azure for big data computing of millions of data points relating to a project, Watson for natural language interfacing with a user), cloud computing environment 230 may enable cloud platform 220 to effectively and automatically manage ticket resolution for a project, thereby improving accuracy of coding, reduction of coding errors, or the like. Such improvements may result in reduction of computing resources expended to complete the project, computing resources utilized when executing software managed or designed during a project, or the like.

Computing resource 215 includes one or more personal computers, workstation computers, server devices, or another type of computation and/or communication device. In some implementations, computing resource 215 may host cloud platform 220. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2A, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by client device 210. Application 215-1 may eliminate a need to install and execute the software applications on client device 210. For example, application 215-1 may include software associated with cloud platform 220 and/or any other software capable of being provided via cloud computing environment 230. In some implementations, one application 215-1 may transmit/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 210), and may manage infrastructure of cloud computing environment 230, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Project data structure 250 includes one or more devices capable of storing and/or providing information associated with a project. For example, project data structure 250 may include a data structure storing a set of project metrics regarding a project, requirements documents describing the project, project rules relating to project development, and/or the like. In some implementations, project data structure 250 may include a data lake type of data structure to store millions or billions of data points relating to ticket data, thereby enabling big data predictions that would be infeasible with other techniques using other types of data structures. Similarly, project data structure 250 may utilize a data summary type of data structure, a data cube type of data structure, or the like, to enable analysis of millions or billions of points of structured or unstructured data from log files, natural language processing of social media resources, or the like. Additionally, or alternatively, project data structure 250 may interact with external data structures to obtain additional information associated with ticket data.

Ticket data archive 260 includes one or more devices capable of storing and/or providing information associated with ticket data. For example, ticket data archive 260 may include a data structure storing historical ticket data, data indicating resolutions associated with the historical ticket data, data indicating effectiveness levels of the resolutions, and/or the like.

FIG. 2B is a diagram of example components of cloud platform 220. As shown in FIG. 2B, cloud platform 220 may include an automatic ticket classification module 270, a machine learning module 272, a resolution identification module 274, a resolution selection module 276, a backup resolution recommendation module 278, a ticket data synchronization module 280, a ticket resolution module 282, an output module 284, a ticket allocation module 286, a shift assignment module 288, and/or a trend determination module 290. In some implementations, one or more modules may be implemented as part of a ticket data model. Portions of cloud platform 220 may interconnect via wired connections, wireless connections, and/or a combination of wired and wireless connections.

Automatic ticket classification module 270 operates on one or more computing resources and is associated with automatically classifying ticket data. For example, automatic ticket classification module 270 may automatically classify ticket data received from client device 210 by comparing the ticket data and historical ticket data stored by ticket data archive 260, and by classifying the ticket data into a ticket type based on the comparison. In some implementations, automatic ticket classification module 270 may apply a text similarity technique, a natural language processing technique, a sentiment analysis technique, or the like, to automatically classify the ticket data. In some cases, automatic ticket classification module 270 may obtain a subset of the historical ticket data, and may use the subset of the historical ticket data to automatically classify the ticket data received from client device 210.

Machine learning module 272 operates on one or more computing resources and is associated with analyzing ticket data. For example, machine learning module 272 may interact with other modules to analyze ticket data. In some implementations, machine learning module 272 may apply text similarity techniques and/or text classification techniques to analyze ticket data. For example, machine learning module 272 may analyze ticket data using a tokenization technique, a lexical analysis technique, an occurrence counting technique, a technique to reduce or eliminate stop words (e.g., a word that occurs frequently in text and may waste processing resources to analyze), a stemming technique (e.g., reducing an inflected word to the word stem to conserve processing resources), a lemmatization technique, additive smoothing technique, and/or the like. In some implementations, machine learning module 272 may analyze ticket data by comparing the ticket data and historical ticket data.

Resolution identification module 274 operates on one or more computing resources and is associated with identifying and proposing a set of recommended resolutions to an issue indicated by ticket data. For example, resolution identification module 274 may identify a set of recommended resolutions to an issue indicated by ticket data received from client device 210, and resolution identification module 274 may propose the identified set of recommended resolutions (e.g., by providing a user interface associated with client device 210). In some implementations, resolution identification module 274 may automatically identify and propose a set of recommended resolutions to an issue indicated by the ticket data. Additionally, or alternatively, resolution identification module 274 may automatically propose a set of recommended resolutions to the issue indicated by the ticket data by applying a machine learning technique to identify a set of recommended resolutions. For example, resolution identification module 274 may identify historical ticket data with the same classification as the ticket data received by client device 210 and may analyze the historical ticket data to determine the set of recommended resolutions.

Resolution selection module 276 operates on one or more computing resources and is associated with selecting a particular resolution, based on a set of selection criteria. For example, resolution selection module 276 may use a resolution scoring submodule to rank resolutions included in the set of recommended resolutions, and may utilize a resolution analysis submodule to determine whether one or more resolutions associated with the set of recommended resolutions satisfy a threshold. In some implementations, resolution selection module 276 may interact with output module 284 to provide a user interface for display via client device 210.

Backup resolution recommendation module 278 operates on one or more computing resources and is associated with analyzing ticket data and historical ticket data. For example, if automatic ticket classification module 270 is unable to classify ticket data, then backup resolution recommendation module 278 may use an analysis submodule to analyze a portion of the historical ticket data that is different than the historical ticket data associated with the ticket type. In this case, backup resolution recommendation module 278 may use a selection submodule to select another resolution that is different than the particular resolution.

Ticket data synchronization module 280 operates on one or more computing resources and is associated with training machine learning module 272. For example, ticket data synchronization module 280 may obtain historical ticket data stored by one or more data structures associated with one or more external ticket data systems, and ticket data synchronization module 280 may use the historical ticket data to train machine learning module 272. In some implementations, ticket data synchronization module 280 may communicate with one or more servers to obtain a large quantity of historical ticket data (e.g., big data), and ticket data synchronization module 280 may synchronize the large quantity of historical ticket data to train machine learning module 272. In some cases, ticket data synchronization module 280 may modify the historical ticket data to ensure that historical ticket data is stored using the same data type (e.g., to allow for efficient big data processing).

Ticket resolution module 282 operates on one or more computing resources and is associated with implementing a resolution to an issue relating to a project. For example, ticket resolution module 282 may implement the resolution selected by resolution selection module 276 by generating code, altering code, removing code, allocating resources, reallocating resources, assigning a developer to the issue, or the like. In some implementations, ticket resolution module 282 may automatically implement the resolution. In other implementations, ticket resolution module 282 may obtain approval from a user associated with client device 210, prior to implementing the resolution. In some implementations, ticket resolution module 282 may include information associated with results of identifying a resolution to an issue in ticket data that is to be provided to a developer for manual resolution.

Output module 284 operates on one or more computing resources and is associated with providing a user interface. For example, output module 284 may provide a particular resolution via a user interface displayed on client device 210. In some implementations, the user interface may display a set of recommended resolutions, and a user may interact with the user interface to select a particular resolution, of the set of recommended resolutions. Additionally, or alternatively, output module 284 may provide a user interface that displays status updates on a particular resolution that is being implemented by ticket resolution module 282.

Ticket allocation module 286 operates on one or more computing resources and is associated with allocating tickets for resolution by a set of developers. For example, ticket allocation module 286 may select a developer to whom to assign a ticket for resolution, such as when cloud platform 220 is not able to automatically resolve the ticket. In some implementations, ticket allocation module 286 may allocate a ticket based on a set of parameters, such as a ticket priority, a ticket age, a developer availability, a set of skills of a developer, or the like. In some implementations, ticket allocation module 286 may group a set of similar tickets for assignment to a single developer, such as based on classifying the set of tickets as pertaining to a similar issue, based on a natural language comparison of the tickets, or the like. In some implementations, ticket allocation module 286 may reassign a ticket to a particular developer. For example, based on a ticket being resubmitted (e.g., after an error recurs), ticket allocation module 286 may assign the ticket to the particular developer to reduce an effort associated with resolving the ticket relative to assigning the ticket to another developer who had not previously worked on the ticket. In some implementations, ticket allocation module 286 may perform an intake procedure on a ticket, such as by rejecting a received ticket (e.g., based on determining that the ticket is incomplete, has already been resolved, etc.), providing information associated with the received ticket to another module for classification and/or resolution, etc.

Shift assignment module 288 operates on one or more computing resources and is associated with assigning work shifts to a set of developers. For example, shift assignment module 288 may determine a set of shifts for a set of developers. In some implementations, shift assignment module 288 may determine the set of shifts based on a set of parameters, such as based on past work history (e.g., which shifts developers previously worked), shift preferences, holidays, seniority, skills, predicted ticket inflow, or the like. In some implementations, shift assignment module 288 may rotate shifts, such as by rotating which developers are assigned to different holidays, which developers are assigned to day shifts after night shifts, etc. In this way, shift assignment module 288 ensures that there are developers to resolve tickets at period of time when a relatively large inflow of tickets is expected (e.g., after a new release, on a high usage day, etc.), and ensures that excessive developers are not assigned at period of time when a relatively small inflow of tickets is expected (e.g., on a holiday, late at night, etc.).

Trend determination module 290 operates on one or more computing resources and is associated with determining one or more trends relating to ticket inflow, issues relating to tickets, or the like. For example, trend determination module 290 may monitor ticket inflow to determine trends relating to quantities of tickets to perform shift assignment, types of tickets to ensure that developers are trained in related skills, or the like. In some implementations, trend determination module 290 may utilize machine learning based categorizations of tickets to determine trends relating to quantities of tickets in each category of ticket, resolution of tickets in each category of ticket, resolution of tickets by each developer, or the like. In some implementations, trend determination module 290 may identify a correlation relating to one or more data points, and may proactively generate a ticket for resolution. In this case, trend determination module 290 may provide the ticket (e.g., to ticket allocation module 286 to allocate the ticket or ticket classification module 270 to initiate automatic resolution of the ticket).

The number and arrangement of devices and networks shown in FIGS. 2A and 2B are provided as an example. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. For example, although modules 270 to 284 and modules 286 to 290 are shown as being operated by a single cloud platform 220, modules 270 to 284 may be operated by a first cloud platform 220 (e.g., a ticket resolution platform) and modules 286 to 290 may be operated by a second cloud platform 220 (e.g., a developer management platform) that may communicate via an interface, such as an application programming interface (API), a secure interface, or the like. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210, cloud platform 220, project data structure 250, and/or ticket data archive 260. In some implementations, client device 210, cloud platform 220, project data structure 250, and/or ticket data archive 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for applying machine learning and/or natural language processing techniques to automatically resolve ticket issues. In some implementations, one or more process blocks of FIG. 4 may be performed by cloud platform 220. In some implementations, one or more process blocks of FIG. 4 may be performed by another device or a group of devices separate from or including cloud platform 220, such as client device 210, project data structure 250, and/or ticket data archive 260.

As shown in FIG. 4, process 400 may include receiving, for automated resolution, ticket data that indicates an issue associated with a project (block 410). For example, cloud platform 220 may receive, from client device 210, ticket data that indicates an issue associated with a project. The ticket data, once received by cloud platform 220, may represent a request to resolve the issue. In some implementations, the ticket data may include information associated with identifying an entity that is requesting to resolve the issue (e.g., a user, a group of users, a business, etc.). Additionally, the ticket data may include information that indicates the issue associated with the project. For example, the ticket data may include quantitative metrics relating to the issue (e.g., an issue relating to an amount of resources available, an issue relating to an amount of processing delay, etc.), qualitative metrics relating to the issue (e.g., a quality control issue, an issue relating to a hardware device degrading in quality, etc.), and/or the like.

In some implementations, cloud platform 220 may receive the ticket data based on providing a user interface to client device 210. For example, cloud platform 220 may receive the ticket data by providing the user interface for display on client device 210 and detecting a user interaction with the user interface to identify the ticket data. Additionally, or alternatively, cloud platform 220 may automatically populate at least a portion of the ticket data by using predictive analytics. For example, cloud platform 220 may apply a natural language processing technique to automatically populate the ticket data based on prior entity preferences. As an example, if an entity (e.g., a particular user) interacts with the user interface of client device 210, and historical ticket data that is associated with the entity relates to a common industry or field (e.g., ticket inquiries associated with the entity may be in a particular software development field), then cloud platform 220 may automatically populate the portion of the ticket data that applies to the common industry or field (e.g., the particular software development field). By using predictive analytics to automatically populate at least a portion of the ticket data, cloud platform 220 conserves network resources by reducing user input error in creating tickets (e.g., a typographical error by a user may cause cloud platform 220 to spend computing resources on attempting to resolve an issue that does not need to be resolved).

In some implementations, cloud platform 220 may receive the ticket data based on processing a document (e.g., a design document, a requirements document, etc.). In this case, cloud platform 220 may apply a natural language processing technique, a machine learning technique, or the like, to process the document. For example, cloud platform 220 may apply a natural language processing technique to analyze the ticket data to determine that the ticket data is associated with an incident, a work error, a technical issue, or the like. Additionally, or alternatively, cloud platform 220 may apply machine learning to identify similar projects based on identified similarities in relevant terms, patterns, or the like. In some implementations, cloud platform 220 may utilize a natural language technique, such as a virtual agent, to communicate with a user using natural language to obtain ticket data, such as to query the user regarding an issue. In some implementations, cloud platform 220 may monitor one or more channels for natural language communication, such as an instant messaging channel, a social media channel, a self-service communication channel, or the like.

In some implementations, cloud platform 220 may, independent of receiving ticket data, generate ticket data by using predictive analytics. For example, assume cloud platform 220 obtains ticket data (e.g., from project data structure 250, from ticket data archive 260, from a third party, etc.) and generates a data model relating to the issues associated with the ticket data. In this case, cloud platform 220 may apply a machine learning technique or an artificial intelligence technique to analyze the data model to predict the occurrence of another issue (i.e. an issue that has yet to be reported). Here, cloud platform 220 may generate additional ticket data to resolve the issue (the additional ticket data being different than the ticket data and/or the historical ticket data).

As an example, assume cloud platform 220 performs ticket resolution for a parent server and ten child servers. Further assume that over a short time period (e.g., an hour), eight of the ten child servers transmit ticket data to cloud platform 220 regarding the same issue. In this case, cloud platform 220 may use predictive analytics to predict that the remaining two child servers may have the same issue. Cloud platform 220 may generate ticket data for the remaining two child servers, and may generate ticket data for the parent server (e.g., if all ten child servers have the same technical issue, the issue may relate to an issue associated with the parent server). By using predictive analytics to detect and resolve ticket issues prior to the issue being reported, cloud platform 220 conserves processing resources and improves overall network efficiency by improving a speed at which the issue may be resolved.

In some implementations, prior to receiving ticket data, cloud platform 220 may generate a ticket data model relating to ticket classification, and cloud platform 220 may use the ticket data model to classify the ticket data, identify a set of recommended resolutions, and identify a particular resolution, of the set of recommended resolutions, as discussed further herein. For example, cloud platform 220 may communicate with a server (e.g., ticket data archive 260, a third party server, etc.) to obtain historical ticket data, and cloud platform 220 may process the historical ticket data to generate a data model relating to ticket classification. The historical ticket data may include information indicating an entity (e.g., a user, a group of users, a business, etc.), information indicating an issue associated with the entity (e.g., an issue that a company or a user seeks to resolve, such as an issue relating to a project or an application, etc.), ticket resolution information that identifies one or more ways in which the issue associated with the project was resolved (which may include failed resolution attempts), information indicating a time in which the issue was resolved, whether an issue was resolved manually or automatically, information indicating an amount of resources used to resolve the issue (e.g., computing resources, human resources, such as time spent by a technician or a developer, etc.), and/or the like. In some cases, cloud platform 220 may generate the ticket data model by separating historical ticket data into groups based on similarities (e.g., different similarities may be associated with different ticket types). In some implementations, a different data model may be generated for each different ticket type.

In some implementations, cloud platform 220 may obtain historical ticket data based on crawling the web. Additionally, or alternatively, cloud platform 220 may obtain historical ticket data based on using a set of application programming interfaces (APIs). By generating a ticket data model, cloud platform 220 is able to process and analyze a large volume of historical ticket data (e.g., big data) in a manner that conserves processing resources relative to processing and analyzing the historical ticket data without use of a ticket data model.

As further shown in FIG. 4, process 400 may include determining a classification of the ticket data (block 420). For example, cloud platform 220 may use a ticket data model to classify the ticket data into a ticket type. The ticket type may be based on information included in the ticket data. For example, the ticket type may be based on information indicating an entity (e.g., a user, a group of users, a business, etc.), information indicating an issue associated with a project (e.g., an issue that a company or a user seeks to resolve, an issue relating to a project or an application, etc.), or the like. Cloud platform 220 may use the ticket type to determine a set of recommended resolutions for the ticket data, as discussed further herein.

In some implementations, cloud platform 220 may use the ticket data model to apply a natural language processing technique to classify the ticket data into a ticket type. For example, cloud platform 220 may apply a natural language processing technique to parse information included in the ticket data, and may compare the information included in the ticket data and information included in the ticket data model (e.g., the information included in the historical ticket data). In this case, cloud platform 220 may, based on the comparison, automatically classify the ticket data into the ticket type.

In some implementations, cloud platform 220 may utilize a cognitive computing engine to classify the ticket data into a ticket type. For example, cloud platform 220 may utilize a cognitive computing engine to apply a machine learning technique, a natural language processing technique, and/or another big data technique, to ticket data and/or historical ticket data. In this case, cloud platform 220 may utilize the cognitive computing engine to analyze the ticket data. For example, cloud platform 220 may analyze data regarding thousands, or even millions of instances of historical ticket data to train the cognitive computing engine, and may utilize the cognitive computing engine to analyze the ticket data after training the cognitive computing engine. In this way, a likelihood of resolving an issue associated with a project is improved relative to attempting to resolve the issue without use of a cognitive computing engine.

In some implementations, cloud platform 220 may receive input, via a user interface, associated with classifying ticket data, and may utilize the input to train a classification model. In this way, cloud platform 220 may reduce an amount of time to train the classification model and/or improving an accuracy of the classification model relative to performing classification without user input. Additionally, or alternatively, cloud platform 220 may provide an initial classification for display via a user interface, and may receive information associated with modifying or altering the initial classification. For example, cloud platform 220 may receive a ticket identifying an issue, classify the ticket using a machine learning system and based on ticket data (e.g., historical ticket data), provide the classification of the ticket for display via a user interface, detect a user interaction associated with specifying whether to use the classification or another, user-determined classification, may use the classification or the other, user-determined classification, and may store information associated with whether the user interaction indicated to user the classification or the other, user determined-classification. In this way, cloud platform 220 may improve an accuracy of the classification, and may reduce an amount of time to train a classification model. Moreover, based on providing the initial classification, cloud platform 220 reduces an amount of computing resources and/or network traffic relative to a user specifying every classification without assistance from cloud platform 220.

By classifying the ticket data into a ticket type, cloud platform 220 may analyze a subset of the historical ticket data to resolve the issue (e.g., a subset with a matching ticket type), thereby reducing utilization of computing resources relative to resolving the issue by analyzing all historical ticket data.

As further shown in FIG. 4, process 400 may include determining a set of recommended resolutions, for the issue associated with the project, based on the classification of the ticket data (block 430). For example, cloud platform 220 may use the ticket data model to determine a set of recommended resolutions for the ticket data. The recommended resolutions may indicate one or more actions for resolving the issue, and may include automatically generating code, altering code, removing code, allocating computing resources, reallocating computing resources, assigning a developer to resolve an issue associated with a project, and/or the like.

In some implementations, cloud platform 220 may determine a set of recommended resolutions based on a subset of historical ticket data. For example, assume cloud platform 220 uses the ticket data model, the cognitive computing engine, or the like, to determine the ticket type of the ticket data. In this case, cloud platform 220 may process the subset of historical ticket data that is associated with the ticket type to determine the set of recommended resolutions. For example, cloud platform 220 may process the subset of historical ticket data to determine the particular resolutions associated with the subset of historical ticket data, and cloud platform 220 may analyze the particular resolutions associated with the subset of historical ticket data to determine the set of recommended resolutions. By determining the set of recommended resolutions based on the subset of historical ticket data, cloud platform 220 conserves processing resources relative to determining recommended resolutions by processing all historical ticket data.

In some implementations, cloud platform 220 may determine a set of recommended resolutions based on receiving input regarding a recommended resolution. For example, cloud platform 220 may receive input identifying a recommended resolution via a user interface, and may store the information identifying the recommended resolution for utilization in generating subsequent recommended resolutions. In this case, a user may use client device 210 to generate an automated solution to a particular issue, cloud platform 220 may receive and store information identifying the automated solution, cloud platform 220 may receive a ticket and classify the ticket (e.g., based on machine learning) as pertaining to the particular issue, cloud platform 220 may obtain the automated solution from a data structure, and cloud platform 220 may implement the automated solution. By utilizing human input to assist in training a machine learning model to recommend resolutions and/or providing recommended resolutions for storage by cloud platform 220, cloud platform 220 may train the machine learning model and be utilized to resolve issues in a reduced amount of time and with improved accuracy relative to training the machine learning model to generate recommended resolutions without any human input.

In some implementations, cloud platform 220 may determine a set of recommended resolutions based on a portion of historical data that is different than the subset of historical ticket data. For example, assume cloud platform 220 uses the data model, the cognitive computing engine, or the like, but is unable to determine the ticket type of the ticket data. In this case, cloud platform 220 may obtain and process a portion of the historical ticket data that is different than the subset of historical ticket data (e.g., historical ticket data of a similar ticket type, all historical ticket data, etc.) to determine the set of recommended resolutions.

In some implementations, cloud platform 220 may determine a set of recommended resolutions based on a set of selection criteria associated with the data model. For example, cloud platform 220 may analyze historical ticket data (e.g., all historical ticket data, a subset of the historical ticket data, etc.) to obtain one or more values that indicate an effectiveness level of a resolution, for one or more issues associated with the historical ticket data (or the subset of the historical ticket data), and the one or more values that indicate an effectiveness level of a resolution may correspond to the one or more issues associated with the historical ticket data. In this case, cloud platform 220 may rank the one or more issues, based on the one or more corresponding values indicating an effectiveness level of a resolution, and may use the rankings to determine the set of recommended resolutions.

Additionally, or alternatively, cloud platform 220 may use the ticket data model to rank the set of recommended resolutions based on an amount of resources required to resolve the issue. For example, cloud platform 220 may determine a set of values indicating an estimated amount of resources needed to resolve the issue. In this case, a value, in the set of values, may correspond to a recommended resolution, in the set of recommended resolutions. Cloud platform 220 may rank the set of recommended resolutions based on determining the corresponding set of values indicating the estimated amount of resources needed to resolve the issue. In some cases, cloud platform 220 may select a particular resolution that corresponds to a value associated with a lowest estimated amount of resources needed to resolve the issue. By ranking resolutions based on an amount of resources (or an estimated amount of resources) needed to resolve the issue, cloud platform 220 is able to conserve processing resources and/or network resources by selecting the most resource-efficient resolution.

In some implementations, cloud platform 220 may use the ticket data model to select a particular resolution, from the set of recommended resolutions. For example, cloud platform 220 may analyze the ticket data and the historical ticket data to determine the set of recommended resolutions for the issue, and may rank the set of recommended resolutions. In this case, cloud platform 220 may select the particular resolution, from the set of recommended resolutions, based on ranking the set of recommended resolutions.

In some implementations, cloud platform 220 may use the ticket data model to select a particular resolution that satisfies a threshold (or that satisfies multiple thresholds). The threshold(s) may indicate an effectiveness level of resolving an issue, an amount of resources to resolve an issue, an amount of time to resolve an issue, a percentage chance of resolving the issue, and/or the like. In some cases, such as when multiple resolutions in the set of recommended resolutions satisfy the threshold, cloud platform 220 may select the particular resolution that satisfies the threshold by the largest margin. For example, if multiple resolutions indicate an 80%+ effectiveness level of resolving an issue, cloud platform 220 may select the particular resolution with the highest effectiveness level of resolving the issue.

Additionally, or alternatively, cloud platform 220 may use the ticket data model to select a particular resolution by applying a natural language processing technique. For example, cloud platform 220 may use a natural language processing technique to select a particular resolution that has the highest effectiveness level of resolving the issue and/or that uses the least amount of resources. As an example, assume a particular resolution involves (or one or more resolutions involve) assigning a developer to resolve an issue associated with the project. In this case, cloud platform 220 may apply a natural language processing technique to parse data relating to potential developers (e.g., a developer schedule, a list of developer skills, etc.). This may allow cloud platform 220 to select the particular resolution that has the highest effectiveness level of resolving the issue and/or that uses the least amount of resources, which conserves processing resources.

As further shown in FIG. 4, process 400 may include implementing a particular resolution, for the issue associated with the project, based on determining the set of recommended resolutions (block 440). For example, cloud platform 220 may implement a particular resolution by performing one or more actions to resolve the issue associated with the project. In some implementations, cloud platform 220 may automatically implement the particular resolution. For example, cloud platform 220 may automatically implement the particular resolution for a project that is internal to cloud platform 220, may automatically implement the particular resolution for a project that is external to cloud platform 220 (e.g., by accessing one or more APIs to gain permission to implement the particular resolution to the project that is external to cloud platform 220), may automatically provide instructions to another device to implement the particular resolution, or the like.

In some implementations, cloud platform 220 may obtain approval to implement the particular resolution. For example, cloud platform 220 may provide the particular resolution for display via a user interface, and may detect a user interface interaction associated with approving the particular resolution. Based on detecting the user interface interaction, cloud platform 220 may implement the particular resolution. In this way, cloud platform 220 reduces a likelihood of inadvertent harm to one or more critical systems resulting from implementing the resolution without oversight.

In some implementations, cloud platform 220 may automatically implement the particular resolution for a project that is internal to cloud platform 220. For example, if an issue reported is internal to cloud platform 220, cloud platform may automatically implement the resolution (e.g., generate additional code, alter or remove existing code, allocate and/or reallocate computing resources, assign a developer to resolve the issue, etc.).

In some implementations, cloud platform 220 may automatically implement the particular resolution to a project that is external to cloud platform 220. For example, cloud platform 220 may use one or more APIs to gain permission to implement the particular resolution to the project. In some implementations, cloud platform 220 may be required to answer one or more security questions prior to gaining permission to access the project. Additionally, or alternatively, cloud platform 220 may request confirmation, from an entity associated with the project, to access the project via the one or more APIs. By automatically implementing the particular resolution, cloud platform 220 achieves faster issue resolution, thereby conserving network resources by decreasing a period of time where a network device is using additional resources to complete a task (e.g., a network device may use additional resources to complete a task when malfunctioning).

In some implementations, cloud platform 220 may automatically communicate with another device to implement the particular resolution to a project. For example, cloud platform 220 may communicate with another device (e.g., client device 210, project data structure 250, ticket data archive 260, another device external to cloud platform 220, etc.). As an example, cloud platform 220 may communicate with project data structure 250 to resolve an issue that requires altering code. In this case, project data structure 250 may store code relating to the project, and cloud platform 220 may access the code to begin to implement the particular resolution. As another example, cloud platform 220 may communicate with another device (e.g., client device 210) to assign a developer to resolve an issue. In this case, client device 210 may store information such as a schedule of a developer, and cloud platform 220 may access the schedule to add a task or schedule a meeting relating to resolving the issue. For example, cloud platform 220 may determine a set of shifts for a set of developers, identify a developer that is active for an upcoming shift and has availability and/or skills to resolve a ticket (e.g., skills relating to a classification of the ticket), and may communicate with client device 210 to automatically assign the ticket associated with the issue to the developer. Similarly, based on the developer having previously resolved a similar issue or a similar ticket (e.g., the same ticket that has been submitted multiple times for a recurring issue), cloud platform 220 may reassign the issue to the developer.

In some implementations, cloud platform 220 may automatically communicate with another device to allow the other device to implement the particular resolution to the project. For example, cloud platform 220 may automatically transmit information that indicates the particular resolution to another device (e.g., client device 210, a server associated with client device 210, etc.), and the other device may implement the particular resolution by applying the particular resolution to code associated with the issue.

In some implementations, cloud platform 220 may implement a particular resolution that includes modifying code and/or computing resources. For example, cloud platform 220 may generate code, alter code, remove code, allocate computing resources, and/or reallocate computing resources to resolve the issue. In some cases, cloud platform 220 may communicate with project data structure 250 to generate code, alter code, remove code, allocate computing resources, and/or reallocate computing resources. In this case, project data structure 250 may store information such as code for a project (or provide a sandbox environment for testing code associated with the project), and cloud platform 220 may implement the particular solution based on accessing the code.

In some implementations, cloud platform 220 cloud platform 220 may implement a particular resolution by assigning a developer to resolve the issue. For example, assume cloud platform 220 generates data that identifies a set of developers capable of resolving the issue, and applies a natural language processing technique to the data to select data that identifies a developer, from the set of developers, to resolve the issue. In this case, cloud platform 220 may assign the developer to resolve the issue. Additionally, or alternatively, based on failing to classify a particular issue, cloud platform 220 may perform a determination of a group of other related incidents (e.g., one or more other tickets determined to be similar based on a natural language processing analysis), and may assign the group of other related issues and the particular issue to a particular developer to resolve or to further classify for resolution. In this way, cloud platform 220 may ensure that tickets that cloud platform 220 is unable to automatically resolve are resolved, while reducing effort relative to manual resolution of each ticket.

In some implementations, cloud platform 220 may automatically determine an effectiveness level of implementing the resolution. For example, cloud platform 220 may automatically determine an effectiveness level of implementing the resolution by testing the resolution in a sandbox environment or by monitoring the project after completion of the particular resolution. As an example, cloud platform 220 may implement a test script to mirror functionality of the project in a sandbox to determine whether the particular resolution resolved the issue. Additionally, or alternatively, cloud platform 220 may determine an effectiveness level of implementing the resolution by receiving feedback. For example, cloud platform 220 may receive feedback from client device 210, and the feedback may indicate an effectiveness level of the resolution. In some cases, cloud platform 220 may use a data structure (e.g., ticket data archive 260) to store the information that indicates the effectiveness level of implementing the resolution.

In some implementations, cloud platform 220 may implement multiple recommendations. In some cases, cloud platform 220 may iteratively implement a series of recommendations until an issue is successfully resolved. In other cases, cloud platform 220 may implement multiple recommendations at the same time, which may provide for faster issue resolution relative to implementing one resolution at a time.

Additionally, or alternatively, cloud platform 220 may generate a user interface associated with identifying the particular resolution for the issue associated with the project. For example, cloud platform 220 may provide, for display via client device 210, a user interface to identify the particular resolution for the issue associated with the project. In some cases, cloud platform 220 may provide, for display via the user interface associated with client device 210, information indicating that the particular resolution was automatically implemented. In other cases, cloud platform 220 may provide, for display via the user interface associated with client device 210, information indicating a set of recommended resolutions. In this case, cloud platform may receive, via an interaction associated with the user interface, a request to implement a particular resolution, of the set of recommended resolutions. Based on receiving the request, cloud platform 220 may implement the particular resolution for the issue associated with the project.

Additionally, or alternatively, cloud platform 220 may determine that the particular resolution did not succeed, and may implement another resolution to the issue. For example, cloud platform 220 may determine that the particular resolution did not succeed by testing an implementation of the particular resolution in a sandbox environment and receiving an indication that the recommendation did not succeed, by implementing the particular resolution on a client device (e.g., client device 210, a server associated with client device 210, etc.) and receiving an indication that the particular recommendation did not succeed, by receiving an update from client device 210 that the particular recommendation did not succeed, or the like.

In some implementations, the particular resolution that did not succeed may be associated with cloud platform 220 analyzing a subset of the historical ticket data, and cloud platform 220 selecting and implementing the particular resolution based on the subset of the historical ticket data. In this case, cloud platform 220 may implement another resolution by processing the remainder of the historical ticket data (or at least a portion of the historical ticket data that is different than the subset of the historical ticket data). Here, cloud platform 220 may generate another set of recommended resolutions, and may select and implement the other resolution in a manner indicated above.

By automatically implementing a particular resolution to the issue, based on consideration of the effectiveness levels of resolutions included in the set of recommended resolutions, cloud platform 220 intelligently conserves computing resources and/or network resources by achieving faster issue resolution times relative to ticket resolution without automation and without consideration of the effectiveness levels of a set of recommended resolutions.

As further shown in FIG. 4, process 400 may include providing information identifying the particular resolution to the issue associated with the project (block 450). For example, cloud platform 220 may automatically provide information identifying the particular resolution of the issue associated with the project (ticket resolution information) to client device 210 and/or ticket data archive 260. The ticket resolution information may include a status update of a resolution, an estimated time until the issue is resolved, an effectiveness level of the resolution, or the like.

In some implementations, cloud platform 220 may automatically provide ticket resolution information to client device 210. For example, cloud platform 220 may automatically provide ticket resolution information after a threshold period of time is satisfied, after a threshold amount of the resolution is completed, or the like. By automatically providing ticket resolution information to client device 210, cloud platform 220 improves customer satisfaction by providing regular feedback on when the resolution is to be completed.

Additionally, or alternatively, cloud platform 220 may automatically update ticket data archive 260. For example, cloud platform 220 may receive information indicating an effectiveness level of the resolution, and cloud platform 220 may transmit the information to ticket data archive 260. In this way, ticket data archive 260 maintains updated information regarding the effectiveness levels of resolutions, and cloud platform 220 may access this information to make subsequent determinations regarding a resolution to implement.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, cloud platform 220 reduces utilization of computing resources based on automatically classifying the ticket data to reduce processing, reduces utilization of computing resources based on faster resolution of a ticket issue, reduces utilization of computing resources and/or network resources based on decreasing a period of time where a network device is using additional resources to complete a task, or the like. Furthermore, faster resolution of a ticket issue improves user experience and minimizes time that a user may lose due to the ticket issue.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
classifying, by a device and using a data model to apply a natural language processing technique, ticket data relating to an issue into a first ticket type;
modifying, by the device and based on receiving an indication to modify a classification of the ticket data, the classification of the ticket data from the first ticket type to a second ticket type;
processing, by the device, using the data model, and based on modifying the classification of the ticket data, historical ticket data;
generating, by the device, using the data model, and based on processing the historical ticket data, a set of recommended resolutions for resolving the issue;
performing, by the device, one or more actions to implement a resolution, of the set of recommended resolutions, to resolve the issue,
the one or more actions including at least one of:
automatically generating additional code directed to resolving the issue,
automatically altering existing code to produce altered code directed to resolving the issue, or
automatically removing existing code to resolve the issue;
applying, by the device, a machine learning technique to one or more of the ticket data or the historical ticket data,
the machine learning technique being applied to predict another issue;
generating, by the device, additional ticket data based on predicting the other issue,
the additional ticket data being different than the ticket data; and
generating, by the device and based on processing the additional ticket data using the data model, another set of recommended resolutions for resolving the other issue.

2. The method of claim 1, further comprising:
crawling an internet for the historical ticket data; and
wherein processing the historical ticket data comprises:
processing the historical ticket data based on crawling the internet for the historical ticket data.

3. The method of claim 1, further comprising:
generating the data model based on obtaining the historical ticket data.

4. The method of claim 1, wherein processing the historical ticket data comprises:
processing a subset of the historical ticket data having the second ticket type.

5. The method of claim 1, further comprising:
selecting the resolution by applying a machine learning technique or a natural language processing technique; and
implementing the resolution based on selecting the resolution.

6. The method of claim 5, further comprising:
updating a ticket data archive based on selecting the resolution.

7. The method of claim 5, further comprising:
monitoring a progress of an implementation of the resolution; and
providing a status update based on monitoring the progress.

8. A device, comprising:
one or more memories; and
one or more processors communicatively coupled to the one or more memories, configured to:
classify, using a data model to apply a natural language processing technique, ticket data relating to an issue into a first ticket type;
modify, based on receiving an indication to modify a classification of the ticket data, the classification of the ticket data from the first ticket type to a second ticket type;
process using the data model, and based on modifying the classification of the ticket data, historical ticket data;
generate using the data model, and based on processing the historical ticket data, a set of recommended resolutions for resolving the issue;
perform one or more actions to implement a resolution, of the set of recommended resolutions, to resolve the issue,
the one or more processors, when performing the one or more actions, are configured to at least one of:
automatically generate additional code directed to resolving the issue,
automatically alter existing code to produce altered code directed to resolving the issue, or
automatically remove existing code to resolve the issue;
apply a machine learning technique to one or more of the ticket data or the historical ticket data,
the machine learning technique being applied to predict another issue;
generate additional ticket data based on predicting the other issue,
the additional ticket data being different than the ticket data; and
generate, based on processing the additional ticket data using the data model, another set of recommended resolutions for resolving the other issue.

9. The device of claim 8, wherein the one or more processors are further configured to:
crawl an internet for the historical ticket data; and
wherein the one or more processors, when processing the historical ticket data, are configured to:
process the historical ticket data based on crawling the internet for the historical ticket data.

10. The device of claim 8, wherein the one or more processors are further configured to:
generate the data model based on obtaining the historical ticket data.

11. The device of claim 8, wherein the one or more processors, when processing the historical ticket data, are configured to:
process a subset of the historical ticket data having the second ticket type.

12. The device of claim 8, wherein the one or more processors are further configured to:
select the resolution by applying a machine learning technique or a natural language processing technique; and
implement the resolution based on selecting the resolution.

13. The device of claim 12, wherein the one or more processors are further configured to:

update a ticket data archive based on selecting the resolution.

14. The device of claim 12, wherein the one or more processors are further configured to:
monitor a progress of an implementation of the resolution; and
provide a status update based on monitoring the progress.

15. A non-transitory computer-readable medium storing instructions, the instructions comprising:
one or more instructions that, when executed by one or more processors, cause the one or more processors to:
classify, using a data model to apply a natural language processing technique, ticket data relating to an issue into a first ticket type;
modify, based on receiving an indication to modify a classification of the ticket data, the classification of the ticket data from the first ticket type to a second ticket type;
process using the data model, and based on modifying the classification of the ticket data, historical ticket data;
generate using the data model, and based on processing the historical ticket data, a set of recommended resolutions for resolving the issue;
perform one or more actions to implement a resolution, of the set of recommended resolutions, to resolve the issue,
wherein the one or more instructions, that cause the one or more processors to perform the one or more actions, cause the one or more processors to at least one of:
automatically generate additional code directed to resolving the issue,
automatically alter existing code to produce altered code directed to resolving the issue, or
automatically remove existing code to resolve the issue;
apply a machine learning technique to one or more of the ticket data or the historical ticket data,
the machine learning technique being applied to predict another issue;
generate additional ticket data based on predicting the other issue,
the additional ticket data being different than the ticket data; and
generate, based on processing the additional ticket data using the data model, another set of recommended resolutions for resolving the other issue.

16. The non-transitory computer-readable medium of claim 15, wherein the one or more instructions, when executed by the one or more processors, further cause the one or more processors to:
crawl an internet for the historical ticket data; and
wherein the one or more instructions, that cause the one or more processors to process the historical ticket data, cause the one or more processors to:
process the historical ticket data based on crawling the internet for the historical ticket data.

17. The non-transitory computer-readable medium of claim 15, wherein the one or more instructions, when executed by the one or more processors, further cause the one or more processors to:
generate the data model based on obtaining the historical ticket data.

18. The non-transitory computer-readable medium of claim 15, wherein the one or more instructions, that cause the one or more processors to process the historical ticket data, cause the one or more processors to:
process a subset of the historical ticket data having the second ticket type.

19. The non-transitory computer-readable medium of claim 15, wherein the one or more instructions, when executed by the one or more processors, further cause the one or more processors to:
select the resolution by applying a machine learning technique or a natural language processing technique; and
implement the resolution.

20. The non-transitory computer-readable medium of claim 19, wherein the one or more instructions, when executed by the one or more processors, further cause the one or more processors to:
monitor a progress of an implementation of the resolution; and
provide a status update based on monitoring the progress.

* * * * *